US005911536A

United States Patent [19]
Roth

[11] Patent Number: 5,911,536
[45] Date of Patent: Jun. 15, 1999

[54] JOINT FOR DEPLOYING AND LOCKING A SOLAR PANEL OR A REFLECTION

[75] Inventor: Martin Roth, Taufkirchen, Germany

[73] Assignee: Daimler-Benz Aerospace AG, Germany

[21] Appl. No.: 08/980,906

[22] Filed: Dec. 1, 1997

[30] Foreign Application Priority Data

Nov. 30, 1996 [DE] Germany ............... 196 49 741

[51] Int. Cl.$^6$ ............................ F16C 11/04
[52] U.S. Cl. .................. 403/119; 16/284; 244/173; 403/145; 403/146
[58] Field of Search .................. 403/119, 120, 403/145, 146, 148, 166, 24; 16/284, 285; 244/173

[56] References Cited

U.S. PATENT DOCUMENTS

| 4,803,970 | 2/1989 | Mattheck et al. ............ 403/145 X |
| 4,880,188 | 11/1989 | Roth et al. ................ 244/173 |
| 5,037,043 | 8/1991 | Roth et al. ................ 244/173 |
| 5,037,231 | 8/1991 | Kitamura ................... 403/120 |
| 5,356,095 | 10/1994 | Aker ...................... 16/284 X |
| 5,393,018 | 2/1995 | Roth et al. ................ 244/173 |
| 5,600,868 | 2/1997 | Tourville et al. ........... 16/285 X |
| 5,673,459 | 10/1997 | Baghdasarian .............. 16/285 X |

FOREIGN PATENT DOCUMENTS

| 0 207 698 | 6/1986 | European Pat. Off. . |
| 0 704 373 A2 | 9/1995 | European Pat. Off. . |
| 32 15 434 A1 | 4/1982 | Germany . |
| 40 32 112 | 10/1990 | Germany . |

Primary Examiner—Harry C. Kim
Attorney, Agent, or Firm—Evenson, McKeown, Edwards & Lenahan, P.L.L.C.

[57] ABSTRACT

A joint for deploying and locking a solar panel or a reflector has a fork which is pivotable through 180° about a common pivot axis with a fixed bearing support. A disk mounted on the fixed bearing support has a sliding curve that terminates in a groove. A latching fork mounted rotatably on pivotable fork has a latching bolt and sliding roller which runs on the sliding curve when the pivotable fork deploys, and together with a latching bolt, engages the groove. A leg spring engages the latching bolt. The sliding curve has a shape such that during the first half of a deployment angle of the fork that is pivoted by the force of a coil spring, a decreasing portion of the coil spring moment is stored in leg spring. In the second half of the deployment angle, a moment 16 stored in leg spring 9 is again added increasingly to the movement, so that during deployment, an approximately constant corrected deployment moment is provided.

5 Claims, 4 Drawing Sheets

: 1

JOINT FOR DEPLOYING AND LOCKING A SOLAR PANEL OR A REFLECTION

BACKGROUND AND SUMMARY OF THE INVENTION

This application claims the priority of German Patent Application No. 196 49 741.8, the disclosure of which is expressly incorporated by reference herein.

The present invention relates to a joint for deploying and locking a solar panel or a reflector that can be pivoted through 180 degrees.

Known joints of this kind have a very high deployment moment at the beginning of the deployment process, and hence exert a high load on both system components. Toward the end of deployment, on the other hand, they have a relatively small moment which, under adverse circumstances, can be insufficient to deploy the solar panels or reflectors completely.

The object of the present invention is to provide a joint for deploying and locking a solar panel or reflector, which ensures an approximately constant deployment moment for the entire duration of the deployment process.

This object is achieved by the joint according to the invention, in which the shape of the sliding curve makes it possible during the first half of the deployment process to store a part of the deployment energy of the coil spring in the leg spring, and to add the stored energy during the second half of the deployment process through the control curve to the motion. In this manner, an approximately constant deployment moment is possible. As a result, both the system components and the joint are relieved of a considerable load, so that the joint itself and the entire deploying structure can be made lighter. In addition, the disturbing moment that acts on the axis is also reduced. In particular, the first impact forces that are present in known joints during deployment are reduced considerably. Furthermore, there is an increase in the reliability of deployment and hence of the joint until it locks. As a result of the higher deployment moment in the locked position, the joint bearing is under constant pressure so that a joint unit with zero play is ensured.

Other objects, advantages and novel features of the present invention will become apparent from the following detailed description of the invention when considered in conjunction with the accompanying drawings.

DETAILED DESCRIPTION OF THE DRAWINGS

Figure 1:
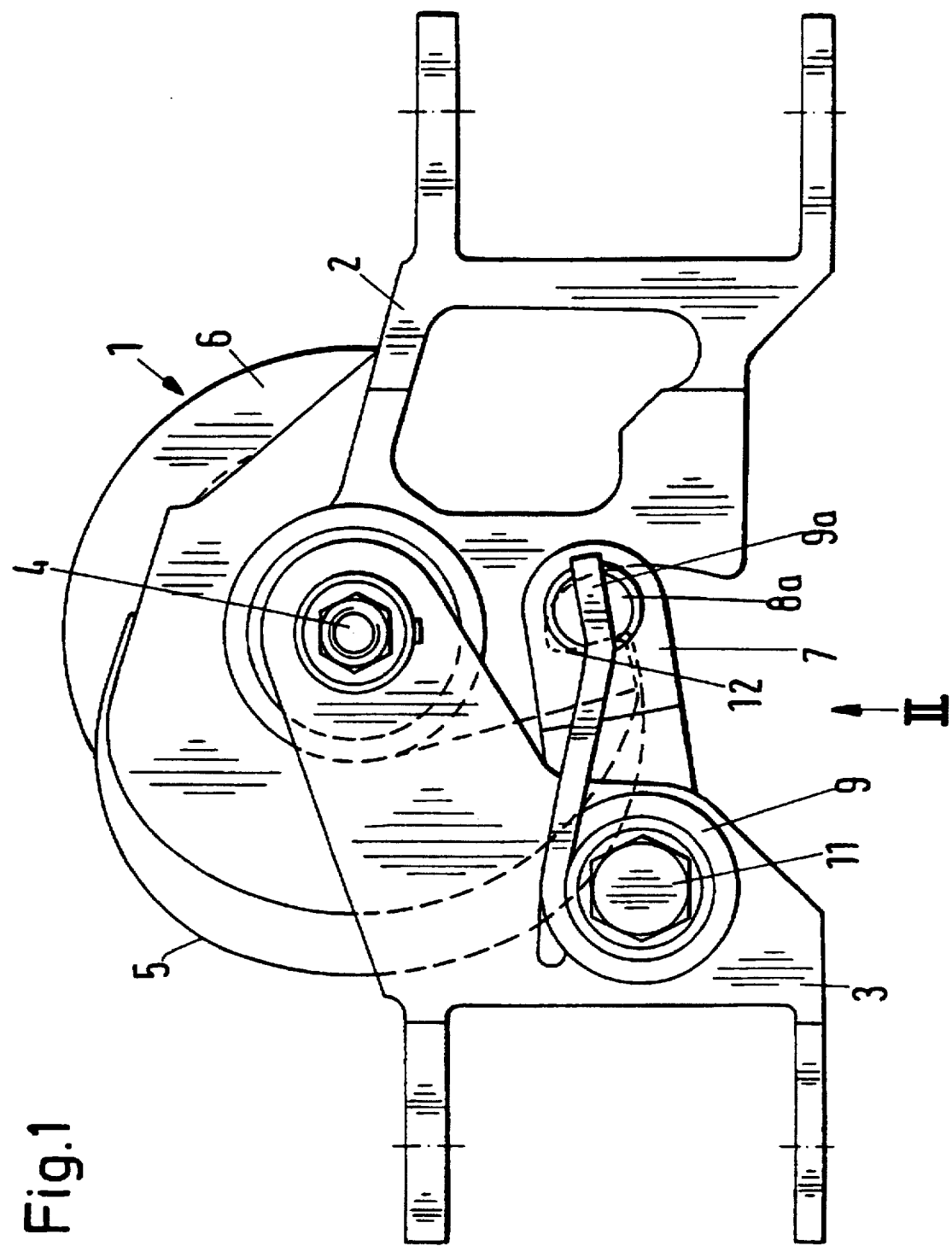
FIG. 1 shows a front view of a joint according to the invention, with the fork completely deployed.
Figure 2:
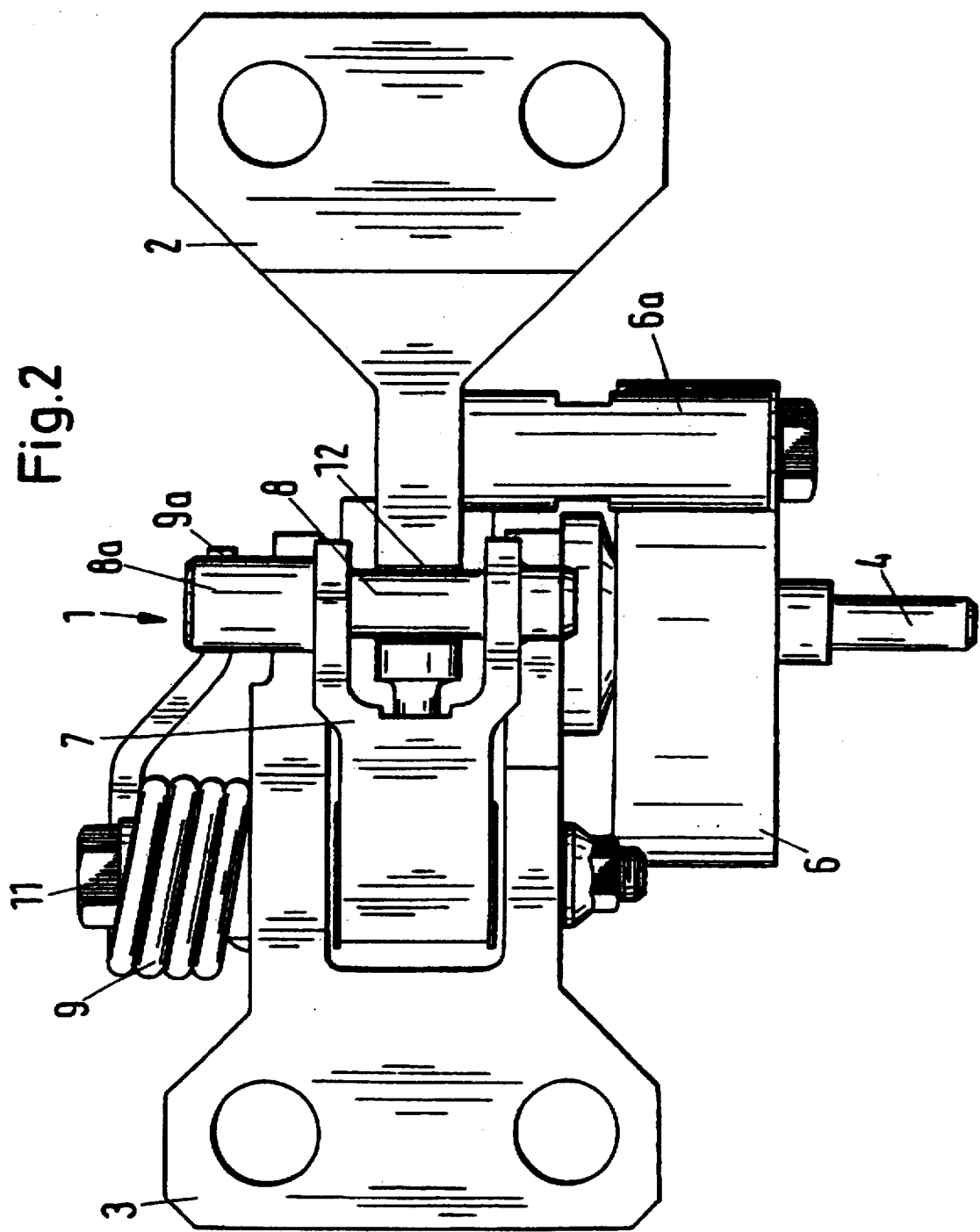
FIG. 2 is a view of the joint of FIG. 1, from the direction of the arrow II in FIG. 1.

A joint 1 according to FIGS. 1 and 2 for deploying and locking solar panels (not shown) has a fixed bearing support 2 and a pivotable fork 3 which have a common axis of rotation 4. Fixed bearing support 2 has a sliding curve 5. Pivotable fork 3 is rotatably mounted on axis 4 and is swiveled outward completely in FIGS. 1 and 2 by an enclosed coil spring 6 located on axis 4. The fixed end of coil spring 6 is screwed to bearing support 2 with the aid of a bolt 6a. (See FIG. 2.) In addition, a latching fork 7 is mounted on fork 3, said fork 7 receiving a latching bolt 8. On fork 3, coaxially with latching fork 7, a leg spring 9 is mounted, whose leg 9a extends through a head 8a of latching bolt 8. Latching fork 7 and leg spring 9 are fastened together by a screw 11 on fork 3.

Figure 3:
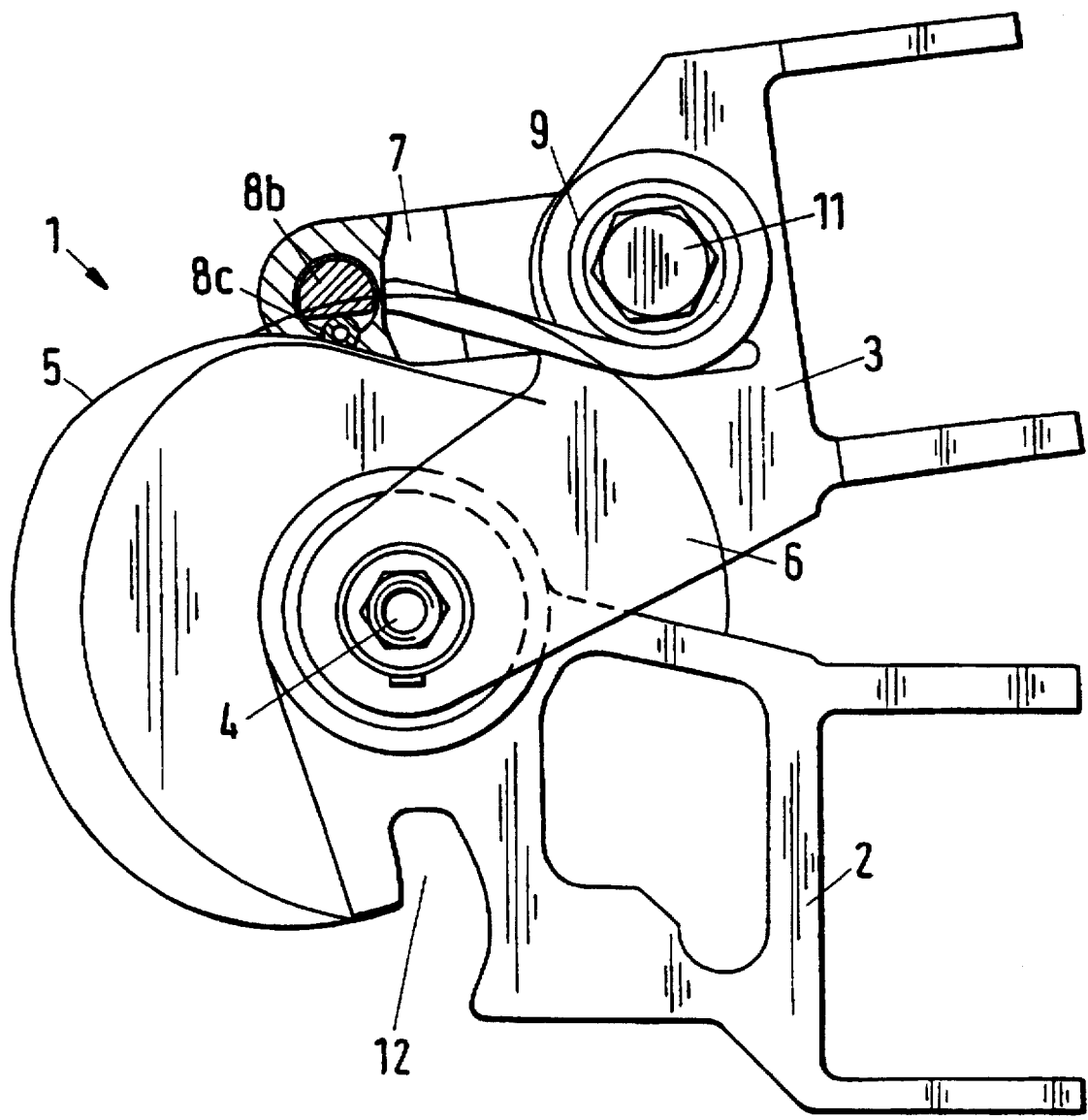
FIG. 3 is a view of the joint of FIG. 1 at the beginning of deployment.

In FIGS. 1 and 2, latching bolt 8 is pressed by leg spring 9 into a groove 12 located at the end of sliding curve 5, locking fork 3 to bearing support 2. As best seen in FIGS. 1 and 3, sliding curve 5 initially has a rising pitch angle, which declines again beyond the middle of sliding curve 5 up to groove 12. This shape of sliding curve 5 makes it possible during the half of the deployment of fork 3 to store part of the deploying energy of coil spring 6 in leg spring 9. This stored energy is then added to the deployment moment during the second half of the deployment by control curve 5. This process is shown described in greater detail in FIG. 4.

FIG. 3 shows joint 1 shortly after commencing deployment of bearing support 3. Here, the end of the latching fork 7 is shown in a sectional view at its end together with latching bolt 8. The latching bolt 8 comprises a fixed main part 8b and a to roller 8c that rolls on sliding curve 5.

Figure 4:
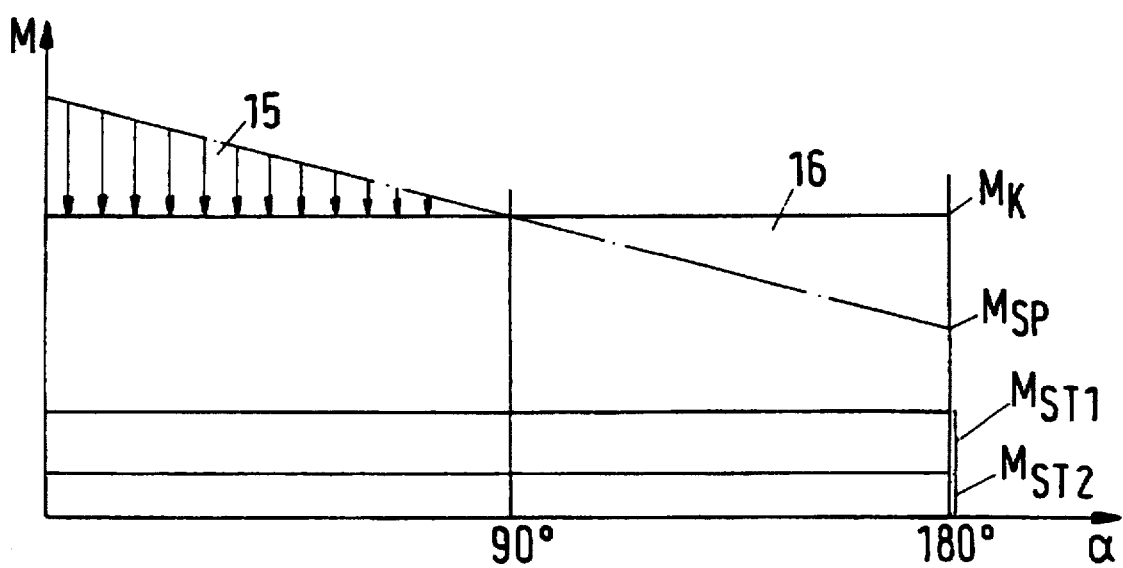
FIG. 4 is a graph showing the moments that develop during deployment as a function of the deployment angle.

FIG. 4 is a graph of the moments that develop during deployment as a function of deployment angle alpha. The moments are composed of disturbing elements $M_{ST}$, the moments of coil springs $M_{SP}$, and the resultant moments of the leg spring and sliding curve $M_K$, which is constant. Disturbing moments include the bearing friction moment during deployment $M_{ST1}$ and the fork bending moment $M_{ST2}$. The uncorrected coil spring moment $M_{SP}$ that causes fork 3 to deploy decreases inversely with deployment angle alpha.

It is clear from FIG. 4 that without correction, the initial moment of $M_{SP}$ is very large, resulting in high stress on the system components, while the end moment of $M_{SP}$ is rather small, so that reliable movement and locking of forks 3 is questionable. Sliding curve 5 according to the invention ensures that an approximately constant corrected deployment moment $M_K$ is obtained over the entire course of deployment angle alpha. This occurs by virtue of the fact that during the first half of the deployment process, a portion 15 of the energy, and hence of the moment of the coil spring $M_{SP}$, is supplied to leg spring 9. Beyond 90° of deployment angle alpha, the further course of sliding curve 5a causes the moment component stored in leg spring 9 during deployment up to 90 degrees to be restored to the deployment moment with moment share 16, thus ensuring the desired approximately constant corrected deployment moment $M_K$.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Joint for deploying and locking a rotatable member, said joint comprising:

a fixed bearing support;

a fork which is pivotable through 180° around a common axis with the bearing support;

a coil spring for pivoting said fork about said common axis for deployment of said rotatable member;

a disk mounted on the fixed bearing support and having a sliding curve that terminates in a groove;

a latching fork rotatably mounted on the pivotable fork;

a latching bolt having a sliding roller which rolls on said sliding curve when the pivotable fork deploys, and, locks into said groove together with said latching bolt; and a leg spring engaging said latching bolt and biasing it against said sliding curve;

wherein the sliding curve has a shape such that during a first half of a deployment angle of the pivotable fork pivoted by a force of the coil spring, a decreasing portion of a coil spring moment is stored in the leg spring, and during a second half of said deployment angle a moment stored in said leg spring is increasingly restored to the movement, whereby an approximately constant corrected deployment moment is provided during deployment.

2. Joint according to claim 1, wherein the sliding curve has a slowly rising pitch angle in the first half of the deployment angle, and decreases down to the groove in the second half of the deployment angle.

3. A joint for pivotably displacing first and second members relative to each other, said joint comprising:

a first pivotable element adapted to be fixedly attached to a first member;

a second pivotable element adapted to be fixedly attached to a second member, said second pivotable element having a common pivot axis with said first pivotable element, and being pivotable relative to said first pivotable element about said common pivot axis, between a stored position and a deployed position of said first and second members;

a first resilient member for causing said second pivotable element to pivot relative to said first pivotable to rotate said first and second members through a deployment angle, from said stored position to said deployed position;

a second resilient member;

a mechanical coupling between said first resilient member and said second resilient member, which coupling transmits a force of said first resilient member to said second resilient member, such that said second resilient member is progressively tensioned during pivoting of said second pivotable element through a first half of said deployment angle, and transmits a force of said second resilient member to said first resilient member during pivoting of said second pivotable element through a second half of said deployment angle.

4. The joint according to claim 3, wherein said mechanical coupling comprises a camming surface and a follower which slides on said camming surface during a pivoting of said second pivotable element through said deployment angle.

5. The joint according to claim 4, wherein:

said follower is coupled to said second resilient member; and said camming surface has a shape such that said second resilient member is progressively tensioned as said second element pivots through said first half of said deployment angle, and is progressively released from tension as said second pivotable element pivots through said second half of said deployment angle.

* * * * *